No. 670,028. Patented Mar. 19, 1901.
C. MALMQUIST.
SCOOP CARRIER.
(Application filed Nov. 19, 1900.)

(No Model.)

WITNESSES:
D. P. Ormes.
Alex. Scott

INVENTOR
C. Malmquist.
BY Chas. D. Swett
ATTORNEY

UNITED STATES PATENT OFFICE.

CHARLES MALMQUIST, OF SIOUX CITY, IOWA.

SCOOP-CARRIER.

SPECIFICATION forming part of Letters Patent No. 670,028, dated March 19, 1901.

Application filed November 19, 1900. Serial No. 37,062. (No model.)

*To all whom it may concern:*

Be it known that I, CHARLES MALMQUIST, a citizen of the United States, residing at Sioux City, in the county of Woodbury and State of Iowa, have invented certain new and useful Improvements in Scoop-Carriers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention is designed to be used in connection with a sand or manure scoop, and is intended to support and swing a scoop large enough to carry an ordinary load and so avoid the necessity of loading and unloading the material into and out of a wagon or cart.

The accompanying drawings illustrate the invention, in which—

Figure 1:
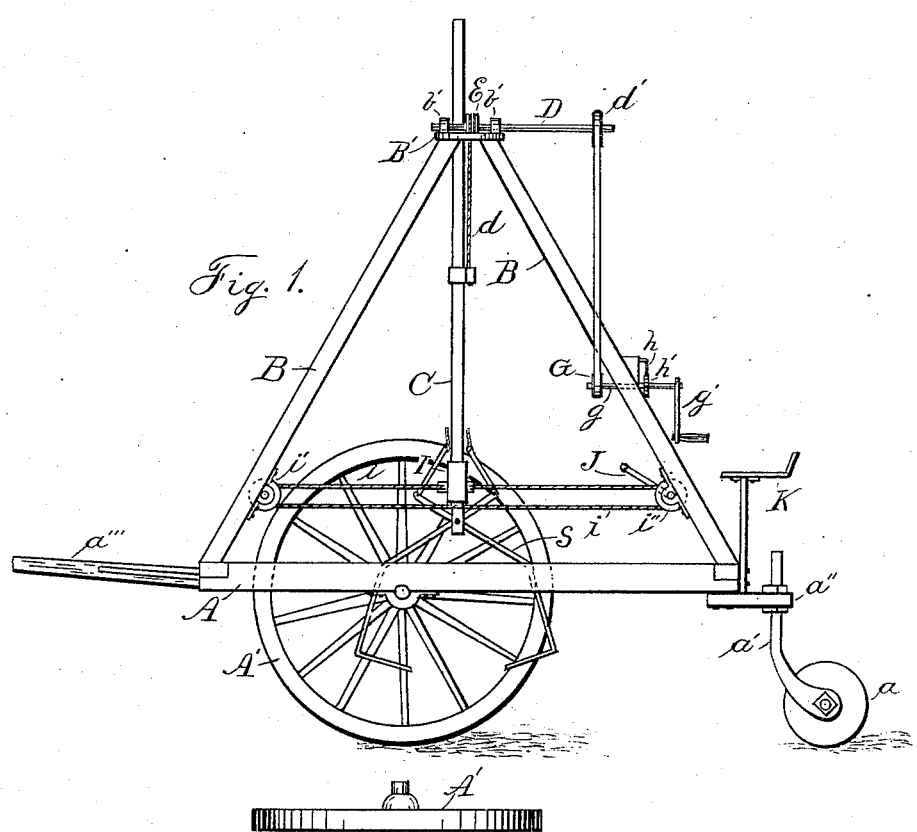
Figure 2:
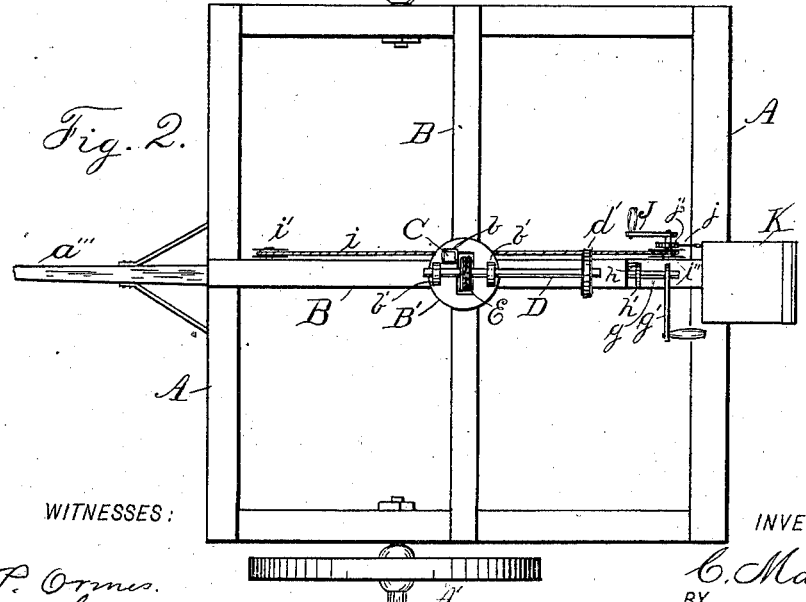

Figure 1 is a side elevation with the rear wheel removed, and Fig. 2 is a general plan view.

Like letters of reference denote corresponding parts in the different views.

The letter A indicates a base-frame, preferably rectangular, having a trundle-wheel A' at each side journaled on said frame, and a small rear wheel $a$, journaled in a vertical post $a'$, which is rotatably held in an extension $a''$ on the frame A. The tongue or pole $a'''$, fragmentarily shown, is attached to the front of the frame A.

B B indicate posts mounted on the base-frame and inclined together at their upper ends, on which is secured a plate B'. A rectangular opening $b$ through this plate permits the vertical motion of a square rod C, which carries a scoop S. (Shown merely in outline.) The rod C fits quite loosely in the opening $b$, and as the plate B' is thin the rod C may also have a swinging motion at its lower end, to which the scoop is fastened, the scoop-operating mechanism being omitted. Perforated ears $b'$ $b'$ on the plate B' furnish bearings for the horizontal shaft D, which carries a grooved wheel E, provided with a cord $d$, whose upper end is fastened to the wheel E and winds upon it like a windlass, the groove in the wheel being deep enough to hold the two or three rounds of the cord required, whose lower end is attached to the rod C, and by which said rod is raised and lowered. Another grooved wheel $d'$ on the extended end of the shaft D is connected by an endless cord or band to a wheel G on a shaft $g$, mounted on a post B, said shaft being operated by a crank $g'$. By turning this crank the scoop S is raised or lowered. A pawl and ratchet $h$ $h'$ holds the crank in the desired position.

I is a sleeve on the rod C between the scoop and the point at which the cord $d$ is fastened to the rod C. To this sleeve are attached the ends of a horizontal cord $i$, which passes around the grooved wheels $i'$ $i''$. The wheel $i''$ is provided with a crank J, pawl $j$, and ratchet $j'$. By these means the rod C bearing the scoop is swung backward and forward or is held in the desired position.

A seat K is provided for the driver and operator on the rear of the base A.

Two or more sets of scoops, with their operative mechanism, may be mounted on the same frame, if desired, by extending the plate B' sufficiently to accommodate the bearings and guide-holes.

What I claim, and desire to secure by Letters Patent, is—

1. A scoop-carrier having a base-frame provided with trundle-wheels and a draft-pole, posts on the carrier meeting at their top a plate thereon, an angular guide-hole in said plate, an angular scoop-rod loosely fitting said hole, ears on said plate to furnish bearings for a horizontal shaft, a shaft to rotate in said bearings, a grooved wheel on said shaft carrying a cord attached to the scoop-rod and means to rotate said shaft and wheel for the purpose herein set forth.

2. In a scoop-carrier having means to carry and vertically move a rod bearing the scoop a sleeve on said rod just above the scoop, a cord attached to said sleeve, grooved wheels on the frame carrying said cord to horizontally move said sleeve and said scoop-rod a crank to operate one of said wheels and a pawl and ratchet for the purpose herein set forth.

3. A scoop-carrier having a base-frame mounted on trundle-wheels and provided with a draft-pole, posts on said frame meeting at their top a plate thereon, an angular guide-hole in said plate, an angular scoop-rod loosely fitting said hole, ears on said plate to furnish bearings for a horizontal shaft, a shaft in said bearings a grooved wheel on said shaft carrying a cord attached to the scoop-rod, a band-wheel on the extended end of said shaft, a band-wheel on a horizontal shaft journaled in the lower part of the rear post a crank on said shaft, a pawl and ratchet to lock said shaft and a band connecting said band-wheels substantially as herein set forth.

In testimony whereof I affix my signature in presence of two witnesses.

CHARLES MALMQUIST.

Witnesses:
ALFRED LARSON,
R. J. ANDREWS.